Dec. 23, 1969

J. B. THOMPSON 3,485,818

1,4,7,10-TETRAAZACYCLODODECENE AND 1,4,7,10,13-
PENTAAZACYCLOPENTADECENE AND PROCESS
FOR THEIR MANUFACTURE

Filed April 5, 1968

INVENTOR.
JEROME B. THOMPSON,
BY
Bailey, Stephens + Huettig
ATTORNEYS

Dec. 23, 1969  J. B. THOMPSON  3,485,818
1,4,7,10-TETRAAZACYCLODODECENE AND 1,4,7,10,13-
PENTAAZACYCLOPENTADECENE AND PROCESS
FOR THEIR MANUFACTURE
Filed April 5, 1968  3 Sheets-Sheet 3

INVENTOR
JEROME B. THOMPSON,

BY *Stephens, Huettig & O'Connell*
ATTORNEYS

United States Patent Office 3,485,818
Patented Dec. 23, 1969

3,485,818
1,4,7,10-TETRAAZACYCLODODECENE AND 1,4,7, 10,13 - PENTAAZACYCLOPENTADECENE AND PROCESS FOR THEIR MANUFACTURE
Jerome B. Thompson, Box 231, Rte. 3, Cumberland, Md. 21502
Continuation-in-part of application Ser. No. 484,293, Sept. 1, 1965. This application Apr. 5, 1968, Ser. No. 725,556
Int. Cl. C07d 55/60, 55/64
U.S. Cl. 260—239                        6 Claims

ABSTRACT OF THE DISCLOSURE 1,4,7,10-tetraazacyclododecene and 1,4,7,10,13-pentaazacyclopentadecene and their production by reaction of triethylene tetramine or tetraethylene pentamine with an equimolar quantity of glyoxal sodium bisulfite, preferably in an aqueous solution containing calcium hydroxide. The compounds can be used in the formation of dyes useful as acid-base indicators.

RELATED APPLICATION

This is a continuation-in-part of application Ser. No. 484,293, filed Sept. 1, 1965 and now abandoned.

SUMMARY OF THE INVENTION

The invention relates to novel compounds 1,4,7,10-tetraazacyclododecene of the formula

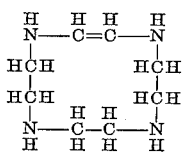

which is obtainable in the form of the cis and trans isomers and 1,4,7,10,13-pentaazacyclopentadecene of the formula

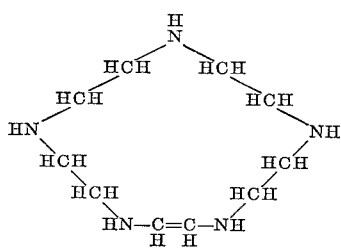

These compounds are produced by reacting glyoxal-sodium bisulfite with triethylene tetramine or tetraethylene pentamine in contact with calcium hydroxide in a molar ratio of about 1:1:2.

The compounds are exceedingly versatile and useful chemicals. The four and five loci of secondary amine activity located as they are within the molecules of such compounds render them unique and valuable intermediates for the preparation of a variety of active and highly selective ion exchange resins and chelating agents. They also render them directly applicable as curing and cross-linking agents in the preparation of epoxy and polyurethane plastics and adhesives, as well as prepolymers for such systems. Also the single center of unsaturation in the proximity of amine groups in each of such compounds is unusually active chemically, especially in neutral and acid solutions. This renders the compounds attractive intermediates for the preparation of dyes and indicators.

SHORT DESCRIPTION OF THE DRAWINGS

In the accompanying drawings:
FIG. 1 shows the infra red absorbence curve of trans-1,4,7,10-tetraazacyclododecene;
FIG. 2 shows the infra red absorbence curve of cis-1,4,7,10-tetraazacyclododecene; and
FIG. 3 shows the infra red absorbence curve of 1,4,7,10,13-pentaazacyclopentadecene.

DETAILED DESCRIPTION OF THE INVENTION INCLUDING PREFERRED EMBODIMENTS

Figure 1:
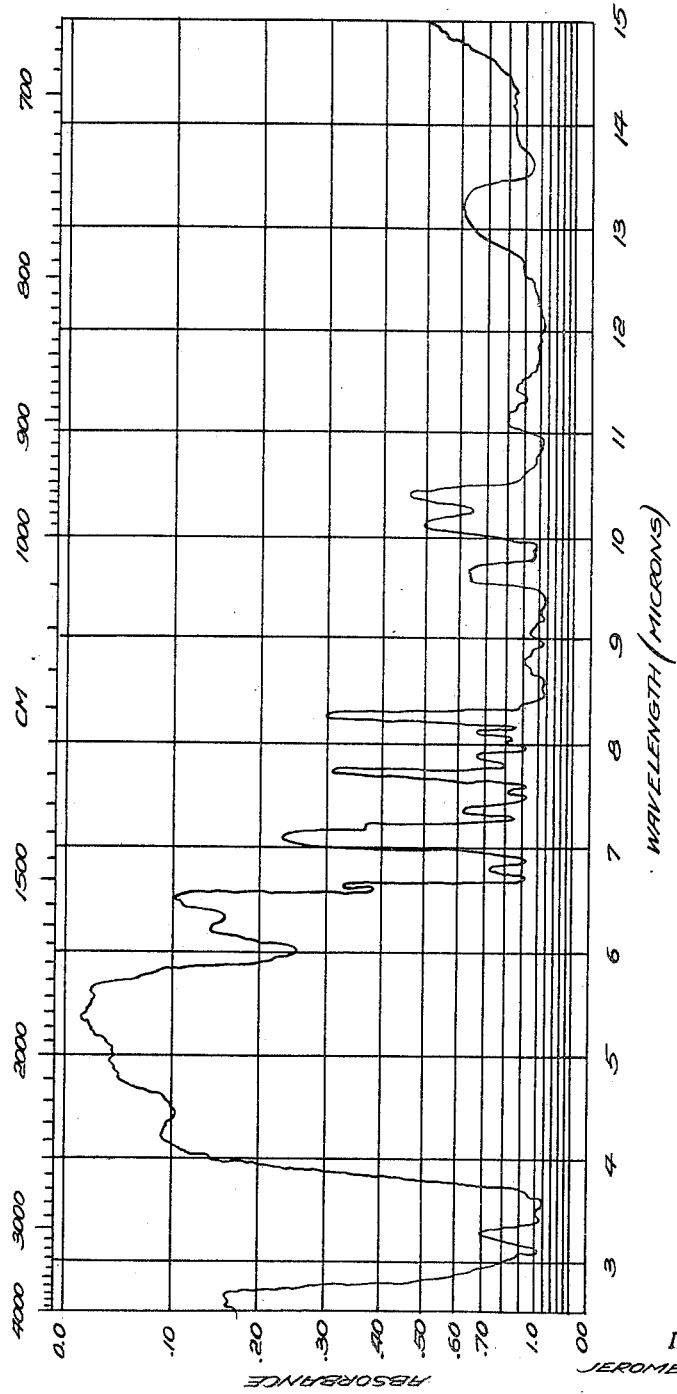

The 1,4,7,10-tetraazacyclododecene and 1,4,7,10,13-pentaazacyclopentadecene are manufactured by the interaction of one mole of triethylene tetramine or tetraethylene pentamine with one mole of glyoxal-sodium bisulfite under such conditions that the production of linear polymers, the usual product, is greatly minimized and by which simultaneous reaction, reduction and rearrangement is permitted. The reaction preferably is carried out in an aqueous solution containing at least about 2 moles of calcium hydroxide. The bisulfite moiety acts as the reducing agent and the desired results are controlled and promoted by the judicious removal of or application of heat.

The following examples will serve to illustrate the invention.

EXAMPLE 1

A reaction vessel equipped with an efficient propeller type stirrer and a thermometer was charged with 43.8 grams of commercial triethylene tetramine, 200 milliliters of water and 52 grams of reagent grade calcium hydroxide. The mixture was stirred in order to obtain maximum solution and cooled with an externally applied bath of iced water to 15° C.

85.3 grams of finely divided granular glyoxal-sodium bisulfite was added to the stirred mixture over a period of about 15 minutes. The initial reaction was quite rapid with generation of heat. The temperature within the reaction vessel was maintained at 15°–20° C. by the use of the cooling bath and controlling the rate of addition of the glyoxal compound. Under these conditions the reaction mixture assumed the color and consistency of a rich cream.

In this process the first intermediate formed is a macrocyclic unstable double Schiff base which in the absence of the excess lime decomposes into an unresolvable mixture of highly colored tars. In the presence of lime, however, the initial rapid reaction is followed by a series of slower ones. The Schiff base is reduced by the sulfite to an enamine structure, sulfite is oxidized to sulfate in part and the calcium ion precipitates the sulfate and excess sulfite as insoluble salts.

The initial reaction was very rapid but slightly limited by the solubility rate of the glyoxal-sodium bisulfite. To compensate and to allow the slower reactions to become complete, the mixture was stirred and maintained at 15°–20° C. for about 1.5 hours. The reaction mixture was then heated to a mild reflux under a condenser and with continued stirring for about one hour to complete the reactions and to digest and coarsen the precipitates.

The first step in purification was accomplished by filtering the hot solution to remove excess calcium hydroxide, calcium sulfite, calcium sulfate and some polymeric by-products of reaction. Total extraction was obtained by triturating the filter cake twice in 100 ml. portions of boiling water and again filtering.

The water was completely stripped from the filtered extracts by the use of heat and vacuum. The impure product, a yellow oil, was extracted from the deposited sodium salts by repeated treatment with boiling benzene. The combined benzene extracts, amounting to about 250 ml. were substantially decolorized by the addition of 10 grams of calcium oxide followed by treatment with 3.0 grams of finely divided activated decolorizing charcoal.

After an interval of an hour or so, the adsorbents were filtered from the extract, and the benzene distilled from this by low temperature vacuum distillation.

The 1,4,7,10-tetraazacyclododecene, at this juncture a faintly yellow oil, was purified by subjecting it to vacuum distillation using a Vigreux fractionating column. At about 4 millimeter of mercury pressure, the desired product distilled over a 3°–5° range at about 110° C. The yield of 1,4,7,10-tetraazacyclododecene was 38.2 grams of colorless oil; this is about 75% of that theoretically possible.

This product appeared pure and homogeneous and remained so for some time. By hydrogenation it was found to have one double bond and a molecular weight of 170.2. Elemental analyses indicate that its empirical formula is $C_8H_{18}N_4$.

However, when it was allowed to stand, the preparation eventually crystallized spontaneously. One of the crystalline forms of trans 1,4,7,10-tetraazacyclododecene separated from the uncrystallizable cis isomer. When the fresh product is seeded with a crystal of the trans isomer crystallization will be completed in a matter of hours; the amount of trans isomer so separating is approximately 35% of the total.

1,4,7,10-tetraazacyclododecene can be differentiated from similar polyethylene amines, linear and cyclic, by an easily applied test based on its reactivity in acid solution and its tendency to form dyes. A drop of the material is dissolved in a little water and a few grains of sodium bisulfite are added. After the salt has dissolved, the solution is acidified with hydrochloric acid. An extremely intense red coloration develops promptly. This dye is an indicator which turns an equally intense yellow when the solution is made basic. This test has value for monitoring the effectiveness of extractions in the preparative procedure as given.

The dye as prepared can be used as an indicator in titrations. At greater dilutions than indicated above the "acid" form is orange rather than the indicated red. Upon titration with a base the color changes to yellow in the pH range of 4.2–5.8. The color change is very sharp. The indicator dye therefore is comparable to Methyl Red.

EXAMPLE 2

A reaction vessel as described in Example 1 was charged with .3 moles of triethylene tetramine and .7 moles of calcium hydroxide and 200 milliliters of water. This mixture was stirred thoroughly and cooled to 0° C. with a bath of ice, salt and water.

.3 moles of glyoxal-sodium bisulfite was added slowly and with constant stirring to this chilled mixture. This addition, over a .5 hour period, was controlled so that the temperature was maintained between 0° and 3° C. The reaction mixture became slightly yellow and a large mass of dark brown particles separated. The temperature was so maintained for 1.5 hours.

The brown particles were the first cyclic intermediate and were an unstable double Schiff base. They were never seen when the reaction was carried out above 6° C.

The temperature of the reaction mixture was allowed to rise; at 5°–6° C. the intermediate disappeared. The mixture was allowed to stand at room temperature for about 12 hours and was refluxed and purified as in Example 1.

The crude product, a slightly yellow oil, was distilled at about 3.5–4.0 mm. Hg pressure. The main body of the 1,4,7,10-tetraazacyclododecene was taken from the condenser of the still in three approximately equal portions between 108° and 111° C. Upon being seeded with trans isomer crystals, each portion yielded up trans isomer. Each portion contained 25–40% of trans 1,4,7,10-tetraazacyclododecene. The total yield was 39.43 grams or about 77.0% of theory.

The temperature at which the initial reaction is conducted has been found to have little effect upon the yield of 1,4,7,10-tetraazacyclododecene or upon the relative proportions of the cis and trans isomers obtained. Reactions have been conducted between 0° C. as in this example and close to the boiling point of the reaction mixture. After seeding the purified preparations and prolonged standing at room temperature, it is possible to obtain a reasonable approximation of the proportions of the isomers present by filtering off the solids and weighing the liquid. Temperature of reaction has little effect upon this ratio.

The effects of temperature of reaction upon the yield of 1,4,7,10-tetraazacyclododecene and the ratios of the isomers estimated as indicated are shown in the following table.

| Temperature of reaction, ° C. | Yield as percent of theory | Amount of cis isomer, percent |
|---|---|---|
| 90–100 | 72.5 | 66.0 |
| 45–50 | 76.7 | 65.3 |
| 25–30 | 77.8 | 65.7 |
| 15–20 | 73.1 | 63.0 |
| 0–5 | 77.0 | 62.0 |

EXAMPLE 3

Trans 1,4,7,10-tetraazacyclododecene in pure form was obtained in the following manner from the mixture of isomers invariably obtained in the processes described.

A mixed product was induced to separate by crystallization of the trans isomer. In practice, this was accomplished by adding a seed crystal of the trans isomer to the mixed 1,4,7,10-tetraazacyclododecene as in Example 1. After crystallization at room temperature was completed, the trans isomer was separated from the liquid by vacuum filtration while excluding air.

The crystals were freed of residues of the cis isomer by dissolving them in about half their weight of warm toluene. They were recrystallized by storing the solution in a 0° refrigerator and then freed of solvent by decanting and vacuum filtering. This recrystallization was repeated twice more and the crystals were washed with petroleum ether to remove toluene. They were dried in a vacuum at low temperature.

Trans 1,4,7,10-tetraazacyclododecene purified in this manner is a white crystalline solid with a melting point by the capillary tube method of 63°–64° C. It is hygroscopic and prone to react with $CO_2$ from the air. The molecular weight has been determined to be 170.2 and the molecule has a single double bond.

Elemental analyses by micro techniques have given the following percentage composition.

| Element | Determined, percent | Theoretical, percent |
|---|---|---|
| Carbon | 57.26 | 56.42 |
| Hydrogen | 10.42 | 10.66 |
| Nitrogen | 32.26 | 32.92 |

The empirical formula is therefore $C_8H_{18}N_4$. An infra red absorbence spectrograph of trans 1,4,7,10-tetraazacyclododecene, as a melt, is presented in FIG. 1.

Trans 1,4,7,10-tetraazadodecene has been vacuum distilled under the same conditions as in Example 2. It boils at the same temperature as the cis isomer so distillation serves no purpose in this purification; it undergoes no discernable conversion to the cis isomer in the process however.

Application of the color test described in Example 1 to the purified trans isomer results in a highly positive red color development.

EXAMPLE 4

The cis 1,4,7,10-tetraazacyclododecene was also obtained in a state of purity in the following manner. The liquid obtained by filtering the crystallized trans isomer from the product as described in Example 3 was held at 0° C. for several days and the small amount of crystals formed, representing the solubility of the trans in the cis isomer at room temperature, was separated by filtering the cold liquid. This process was repeated until no haze formed in the liquid upon prolonged standing at 0° C.

The clear liquid was then treated with about ½% by weight of calcium oxide to react with any traces of water or carbon dioxide it might have acquired in the manipulations and was redistilled at about 4 mm. Hg. The distillation caused an insignificant amount of conversion of the cis isomer as prolonged storage in the cold produced no crystals.

Cis 1,4,7,10-tetraazacyclododecene is a slightly viscous water white liquid. It is hygroscopic in moist air and reacts with $CO_2$. It responds to the qualitative test described in a highly positive manner. The molecular weight by calibrated reduction is 170.2 and the molecule possesses a single double bond.

Microelemental analyses have indicated it to have the following composition which corresponds closely to the empirical formula, $C_8H_{18}N_4$.

| Element | Determined, percent | Theoretical, percent |
|---|---|---|
| Carbon | 56.56 | 56.42 |
| Hydrogen | 10.29 | 10.66 |
| Nitrogen | 33.08 | 32.92 |

Figure 2:
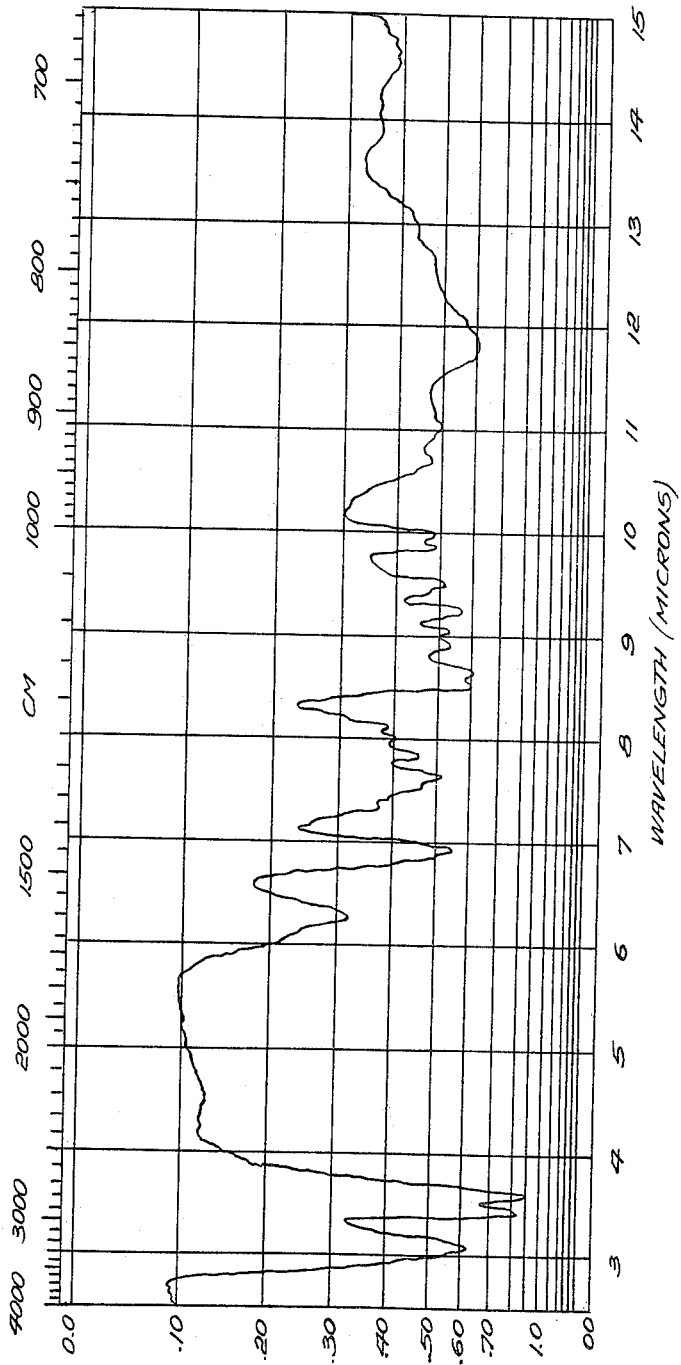

The compound produces an infra red absorbence curve which permits it to be identified and differentiated from other compounds including its isomer. The spectrograph for the liquid cis 1,4,7,10-tetraazacyclododecene so purified is presented in FIG. 2.

In common with many classical examples of cis-trans isomer pairs, the cis 1,4,7,10-tetraazacyclododecene is more labile than the trans and may be converted to it. The conversion may be accomplished most readily by acidifying a cold aqueous solution of the cis isomer with a cold solution of hydrochloric acid; a ratio of four moles of the acid to one of amine is satisfactory. The acid solution is allowed to stand for several hours during which period considerable color develops. The solution is then made strongly basic with a cold solution of sodium hydroxide. It is then vacuum distilled to dryness and the amine reextracted. Losses occur, color bodies are formed but substantial conversion to the trans isomer occurs, and it can be purified by the process given in Example 3.

The preferred process for the preparation of 1,4,7,10-tetraazacyclododecene, cis and trans, is substantially that given in Example 1. The mole ratio of triethylene tetramine to glyoxal-sodium bisulfite is 1:1. Excess triethylene tetramine is removed at the distillation step in the purification; excess glyoxal adducts are removed in the purification as given. Neither reagent in excess improves the percentage yield of 1,4,7,10-tetraazacyclododecene.

The calcium hydroxide may be used at 1 to 3 moles for each mole of the product to be expected. Two moles are required to precipitate the sulfites and sulfates resulting in the reactions. A slight excess beyond this simplifies the purification of the reaction mixture, improves yield slightly and is preferred. Lime is the preferred reagent. It has the necessary basicity, sufficient solubility and sulfites and sulfates formed by the calcium are relatively insoluble. It is also available in high purity and economically so.

As has been shown, reaction temperature has little effect upon the yield of 1,4,7,10-tetraazacyclododecene or its isomer composition. As a matter of convenience and economy, ambient temperatures, usually ranging from 10° to 40° C. are preferred.

The procedure given for working up the reaction mixture is effective. It can obviously be varied considerably without effecting the basic characteristics of this invention.

The preparative procedures described for 1,4,7,10-tetraazacyclododecene give a mixture of the geometric isomers. For most uses this is of small import since their chemistry is practically identical. As a matter of convenience and analogy rather than assurance, the isomer with the higher melting point is called trans; the other liquid and more labile isomer is referred to as the cis isomer. Methods are provided however by which these isomers can be isolated in purified form and identified.

EXAMPLE 5

A reaction vessel equipped with an efficient propeller type stirrer and a thermometer was charged with 56.8 grams of commercial grade tetraethylene pentamine, 300 milliliters of water and 49.8 grams of reagent grade calcium hydroxide. The mole ratio of calcium hydroxide to tetraethylene pentamine was in this instance 2.25:1.

This mixture was stirred and cooled to 0° C. using a bath of mixed ice-salt-water and then 85.23 grams of finely powdered glyoxal-sodium bisulfite were introduced slowly so that the temperature within the vessel remained below 5° C. The time required to make addition of glyoxal-sodium bisulfite was about 20 minutes. The mole ratio of this reagent to the amine employed was 1:1.

Stirring and cooling was continued for two hours with the temperature remaining between 0° C. and 5° C. and then for two hours further without cooling at an ambient temperature of 20°–25° C. The reactions were completed by heating the stirring mixture slowly to reflux temperature and refluxing under a condenser for one hour.

The reaction mixture was then filtered hot to remove the precipitated calcium salts and excess lime, the filter cake being washed with hot water until free of product. The water was removed from the filtered solution by vacuum distillation.

The residuum from the distillation was extracted with hot isopropyl alcohol in small portions until testing revealed that removal of the product from the salts was substantially complete. The portions of alcohol were decanted through a filter; the amount employed was about 250 milliliters in 4–5 portions.

The alcoholic extract was then treated with a small amount, 5–10 grams, of activated decolorizing charcoal and again filtered. The solution, with color reduced, was stripped of solvent by vacuum distillation leaving a yellow oil the weight of which would indicate practically complete recovery of the organic portions of the reagents used in the reaction.

This crude product was then purified by subjecting it to vacuum distillation using a short Vigreux fractionating column. At about 4 millimeters of mercury pressure, that fraction distilling over a 3°–5° C. range of about 145° C. was collected. The yield of 1,4,7,10,13-pentaazacyclopentadecene was 43.0 grams. Assuming a pure tetraethylene pentamine starting material, this is approximately 67% of that theoretically possible.

The initial reaction is an exothermic one resulting in the formation of a macrocyclic double Schiff base and is quite rapid. In the presence of excess lime the base is relatively stable and more slowly undergoes a series of further changes.

In these reactions the Schiff base is reduced to the desired double enamine structure by a portion of sulfite derived from the glyoxal complex. That sulfite not oxidized and some of the sulfate formed are precipitated as calcium salts and, with the excess calcium hydroxide, are removed by filtering. The sodium ion, from the glyoxal complex, remains as sodium sulfate after extraction of the organic products with alcohol.

The reactions postulated would indicate that one mole of lime for each of the expected product should be sufficient. It would neutralize the protons of the bisulfite component and precipitate the unoxidized sulfite. Using the procedure described, reactions have been conducted using various mole ratios of calcium hydroxide. The data summarized below points up conclusively that lime has functions other than the obvious in this reaction.

| Moles of lime/mole of amine: | Yield, percent theory |
|---|---|
| 0 | 0 |
| 1.00 | 0–5 |
| 2.00 | 63.5 |
| 2.25 | 67.8 |
| 3.00 | 62.6 |

With no lime present, the reaction mixture yields a product which consists of a very dark colored viscous undistillable mass; with one mole equivalent of lime, the yield of desired product is not significantly better. There is no significant difference in the yield of 1,4,7,10,13-pentaazacyclopentadecene when two or three mole equivalents of calcium hydroxide are employed. Obviously two moles of lime are entering into the reaction in some manner. It has been found empirically that an excess of 10–20% has some protective effect and provides an increase in yield. Further excess reduces yield; lime can react with the glyoxal-sodium bisulfite and cause polymerization of the glyoxal liberated.

The distilled pure 1,4,7,10,13 - pentaazacyclopentadecene is a slightly viscous oil; in thin layer it appears to be substantially colorless, but bulk quantities have a faint yellow tint. It is homogeneous and shows no tendency to crystallize even after prolonged storage under refrigeration.

By reduction in a calibrated hydrogenator, it has been determined that the compound has a molecular weight of 213.3 and possesses a single double bond. Elemental microanalyses have yielded the data tabulated below which substantiates that the empirical formula of 1,4,7,10,13-pentaazacyclopentadecene is $C_{10}H_{23}N_5$.

| Element | Determined, percent | Theoretical, percent |
|---|---|---|
| Carbon | 55.6 | 56.3 |
| Hydrogen | 11.0 | 10.9 |
| Nitrogen | 32.1 | 32.8 |

Figure 3:
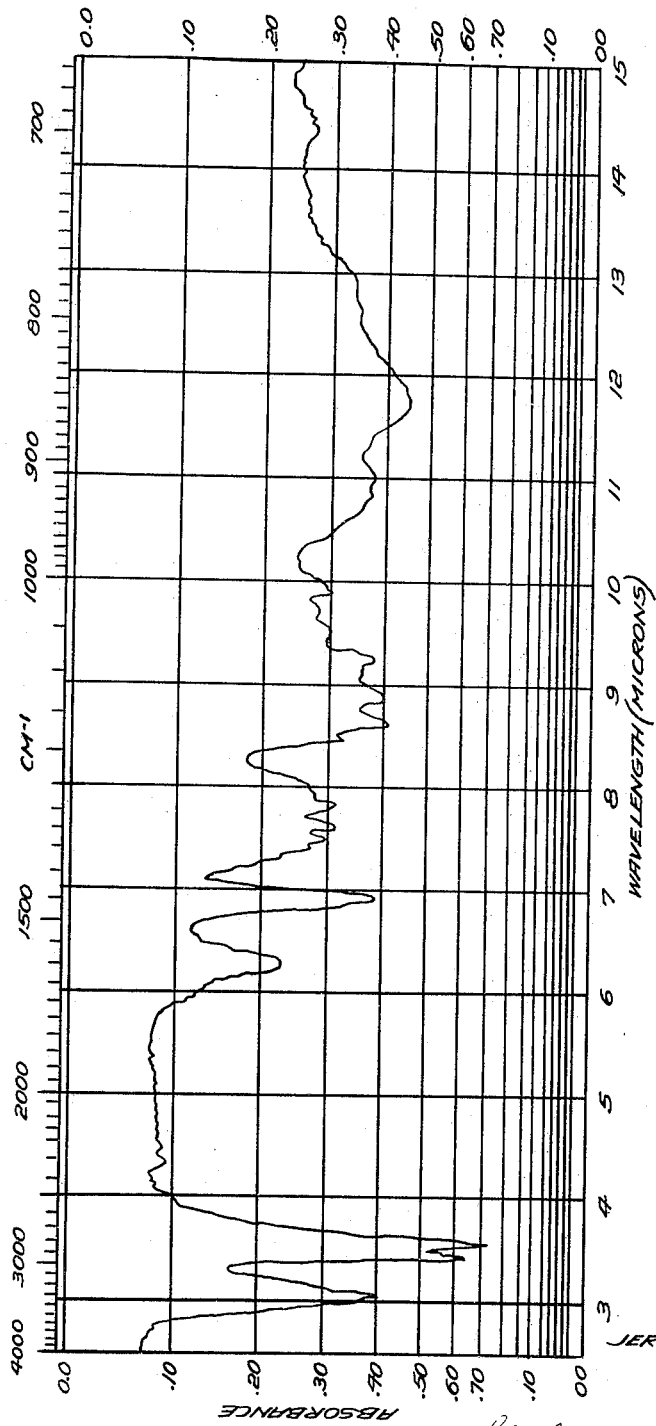

The infra red absorption spectrogram for 1,4,7,10,13-pentaazacyclopentadecene presented (FIG. 3) provides a ready and permanent means for the positive identification of the compound.

In theory, 1,4,7,10,13-pentaazacyclopentadecene should exist as cis and trans isomers. Comparison of the infra red absorption spectrogram of this compound with similar charts of 1,4,7,10-tetraazacyclododecene mixed and as separated isomers suggests strongly that the isomers are present and in a ratio of about 1:1. The isomers are evidently very similar in all physical properties or are readily interconverted; no tendency toward spontaneous resolution as is the case with the 1,4,7,10-tetraazacyclododecene has been observed.

1,4,7,10,13-pentaazacyclopentadecene is very soluble in water with which it forms a series of hydrates exothermically. It is soluble in benzene as well as the lower alcohols. It acts as a relatively strong base and forms salts with acids; it reacts with carbon dioxide.

1,4,7,10,13-pentaazacyclopentadecene can be differentiated from similar amines, linear and cyclic, by the easily applied test described in Example 1 and also as described in Example 1 the dye formed can be used as an acid base indicator.

EXAMPLE 6

A reaction vessel was prepared and charged with .30 moles of tetraethylene pentamine, .675 moles of calcium hydroxide and 300 milliliters of water as in Example 5. Instead of cooling however the reaction mixture was held at 20°–25° C. during the addition of .30 moles of glyoxal-sodium bisulfite and for a total reaction time of two hours.

The reaction mixture was then directly refluxed under a condenser and stirred for one hour. It was worked up as described in Example 5.

The yield of 1,4,7,10,13-pentaazacyclopentadecene was 40.2 grams or about 63% of theory.

EXAMPLE 7

A reaction vessel was prepared and charged as in Example 5. Instead of cooling, the mixture was heated to and held at 60°–65° C. during the 10 minutes required for adding the glyoxal-sodium bisulfite and thereafter for one hour. The mixture was then refluxed and worked up as previously described.

The yield of purified 1,4,7,10,13-pentaazacyclopentadecene was 38.4 grams or 60% of theory.

The preferred process for the preparation of 1,4,7,10,13-pentaazacyclopentadecene is substantially that presented in Example 5.

The preferred mole ratio of tetraethylene pentamine to glyoxal-sodium bisulfite is that actually reacting or 1:1. Departures from this ratio serve no useful purpose.

The calcium hydroxide is best used at between two and three moles for each mole of product expected. Experience indicates that a mole ratio of about 2.25:1 is about optimum. Lesser amounts cause serious reductions in yield. Lime is the preferred reagent for promoting the desired reactions being both functional and economical. There is no sound theoretical basis for this functionality.

Heat during the initial reaction causes comparatively greater increases in the rates of side reactions and therefore a decrease in yield (Examples 6 and 7). Reaction temperatures are best kept as low as practicable.

The procedure given for working up the reaction mixture in preparation for distilling to obtain the pure amine is effective. It can obviously, however, be varied in any or all particulars without altering the basic nature or objectives of this invention.

I claim:
1. A compound selected from the group consisting of 1,4,7,10 - tetraazacyclododecene and 1,4,7,10,13-pentaazacyclopentadecene.
2. A compound according to claim 1, cis-1,4,7,10-tetraazacyclododecene.
3. A compound according to claim 1, trans-1,4,7,10-tetraazacyclododecene.
4. A process for the production of a compound according to claim 1 selected from the group consisting of 1,4,7,10 - tetraazacyclododecene and 1,4,7,10,13 - pentaazacyclopentadecene which comprises reacting an amine compound selected from the group consisting of triethylene tetramine and tetraethylene pentamine with gloxalsodium bisulfite in contact with calcium hydroxide.
5. The process of claim 4 in which the molar ratio of the amine compound, glyoxal-sodium bisulfite and calcium hydroxide is from about 1:1:2 to about 1:1:3 and the reaction is carried out in an aqueous medium at a temperature between about 0° and 100° C.
6. The process of claim 5 in which the molar ratio of the reactants is about 1:1:2.25.

References Cited

UNITED STATES PATENTS 1,951,992   3/1934   Perkins _____ 260—239

ALTON D. ROLLINS, Primary Examiner

U.S. Cl. X.R.

8—76; 252—194, 408; 260—2, 72, 77.5